United States Patent [19]
Sillere

[11] Patent Number: 5,014,270
[45] Date of Patent: May 7, 1991

[54] DEVICE FOR SYNCHRONIZING A PSEUDO-BINARY SIGNAL WITH A REGENERATED CLOCK SIGNAL HAVING PHASE JUMPS

[75] Inventor: E. Thierry Sillere, Paris, France

[73] Assignee: SAT (Société Anonyme de Telecommunications), Paris, France

[21] Appl. No.: 515,048

[22] Filed: Apr. 26, 1990

[30] Foreign Application Priority Data

May 3, 1989 [FR] France .................. 89 5905

[51] Int. Cl.⁵ .................................. H04J 3/06
[52] U.S. Cl. ........................ 370/101; 370/102; 370/100.1; 375/112
[58] Field of Search .............. 370/100.1, 101, 102, 370/103, 105.3; 375/110, 106, 118, 111, 112

[56] References Cited

U.S. PATENT DOCUMENTS

| | | | |
|---|---|---|---|
| 3,919,647 | 11/1975 | Haass | 375/118 |
| 3,980,820 | 9/1976 | Niemi | 370/105.3 |
| 4,119,796 | 10/1978 | Jones | 375/111 |
| 4,408,333 | 10/1983 | Fujii | 375/118 |
| 4,569,063 | 2/1986 | Perry | 370/105.3 |
| 4,669,080 | 5/1987 | Aveneau et al. | 370/101 |
| 4,821,296 | 4/1989 | Cordell | 375/111 |

*Primary Examiner*—Douglas W. Olms
*Assistant Examiner*—H. Kizou
*Attorney, Agent, or Firm*—Laubscher, Presta & Laubscher

[57] ABSTRACT

A synchronizing device synchronizes a pseudo-binary signal particularly affected by high jitter with a regenerated clock signal into a synchronized signal. The device can be included between an output of a bipolar-to-binary converter receiving a plesiochronous bipolar signal and an input of a HDB/binary transcoder in a synchronizing circuit of a time-division multiplexer. The clock signal has a period Tj substantially lower than the nominal period of the pseudo-binary signal and offers phase jumps, particularly included between Tj/2 and Tj, for the clock signal to have a mean period equal to the nominal period. The device preferably comprises, on the input side, a flip-flop used as a divide-by-2 frequency divider for providing a first logic signal alternately having logic levels "0" and "1" in response to transitions "0" to "1" in the pseudo-binary signal, then a second flip-flop for phasing the transitions in the first logic signal with active transitions "0" to "1" of the clock signal thereby deriving a phased logic signal, and two flips-flops and a Exclusive-OR gate for supplying the synchronized signal with pulses which are at level "1" and which have a width calibrated as a function of the period of the clock signal and which are respectively derived in response to the transitions of the phased signal.

12 Claims, 4 Drawing Sheets

TIMING SIGNAL REGENERATING CIRCUIT

PSEUDO-BINARY SIGNAL CALIBRATING AND SYNCHRONIZING CIRCUIT 9+

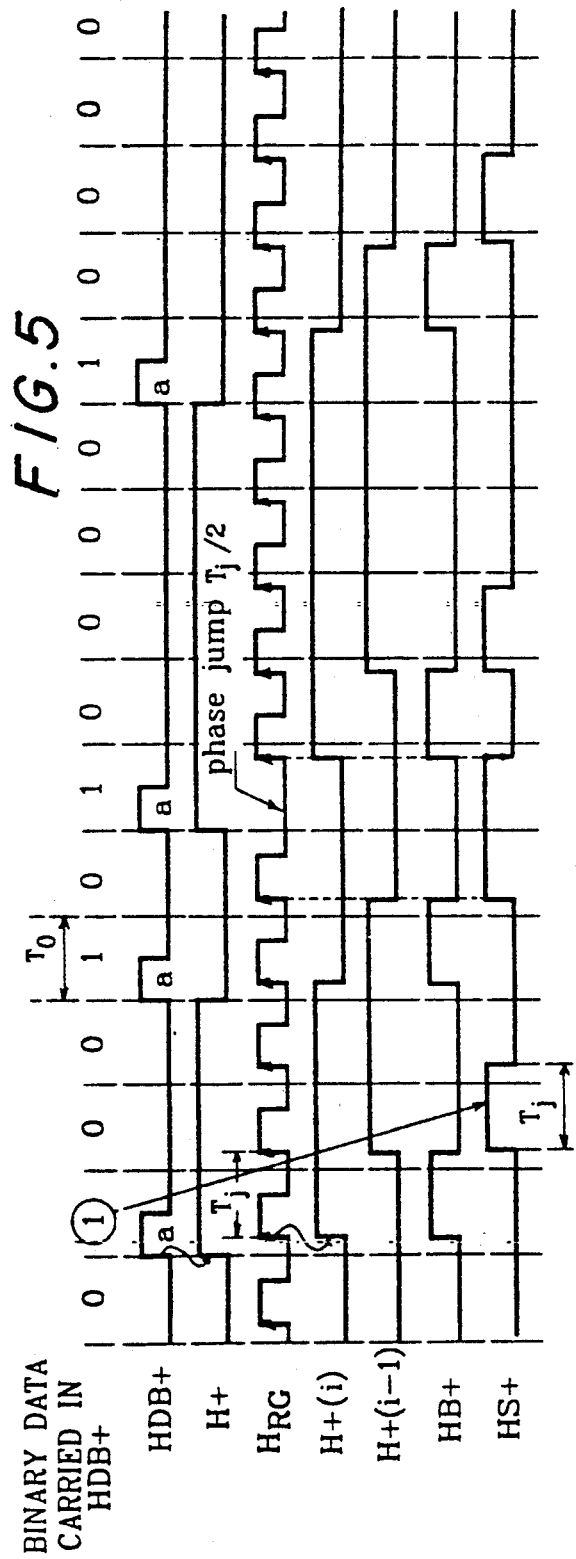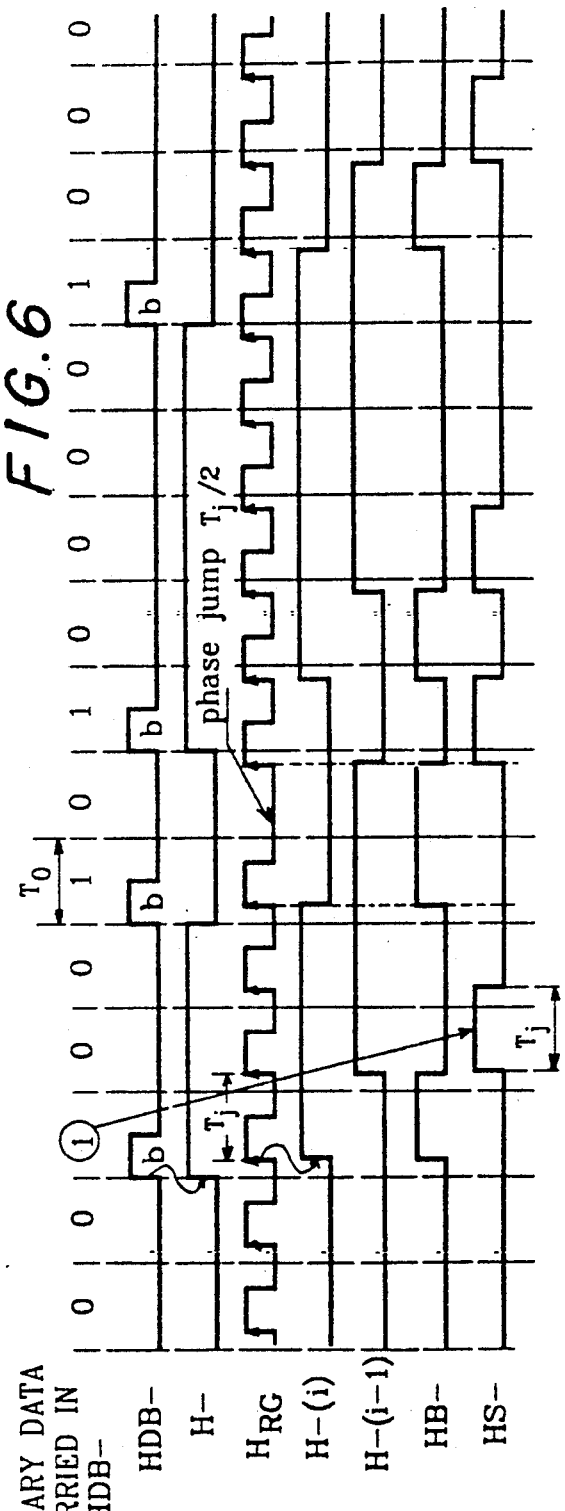

DEVICE FOR SYNCHRONIZING A PSEUDO-BINARY SIGNAL WITH A REGENERATED CLOCK SIGNAL HAVING PHASE JUMPS

BACKGROUND OF THE INVENTION

1. Field of the Invention

The present invention relates to a device for synchronizing a pseudo-binary signal with a clock signal into an outgoing synchronized signal.

The expression "pseudo-binary signal" hereinafter designates a logic signal having a nominal period and comprising first and second binary elements as defined hereinafter. A first binary element is signalled by first and second complementary logic levels respectively substantially during first and second successive nominal half-periods. A second binary element is signalled by the second logic level substantially during a nominal period. Moreover, a first binary element is always flanked by two second binary elements, i.e. it succeeds a second binary element and precedes another second binary element.

2. State of the Art

Two such pseudo-binary signals are produced by known bipolar-to-binary converters. The first binary elements correspond to positive polarity marks, or to negative polarity marks in a bipolar signal received by the converter.

The clock signal has a clock period substantially lower than the nominal period, and offers periodical phase jumps for the clock signal to have a mean period almost equal to the nominal period. Such a clock signal can be regenerated from a bipolar signal received by the converter as a function of a non-phase-shifted local clock signal having a period that is a sub-multiple of said regenerated clock period.

Such pseudo-binary and regenerated clock signals are notably derived in synchronizing circuits for synchronizing plesiochronous signals by means of a positive stuffing method with a view to multiplexing them in a time-division multiplexer as disclosed in U.S. Pat. No. 4,669,080.

According to the prior art, the local clock signal has a period strictly lower than the nominal half-period of the pseudo-binary signal. As a result, the phase jumps which has an amplitude equal to a fraction of the period of the regenerated clock signal, intervene during first nominal half-periods of the binary elements of the pseudo-binary signal, by means of the logic circuitry included in the synchronizing circuit. In other words, the significant instants of the regenerated clock signal, such as predetermined active transitions, usually from the second logic level "0" to the first logic level "1", in the regenerated clock signal oscillate between the limits of the first nominal half-periods in order to differentiate the binary elements.

For instance, the use of a simple bistable flip-flop synchronized by the regenerated clock signal enables the pseudo-binary signal to be reshaped into a synchronized signal. Two such flips-flops are included in the inputs of a HDB/binary transcoder included in the above-mentioned synchronizing circuit and producing a reshaped binary signal corresponding to the received bipolar signal. The flip-flop thus enables the level of the pseudo-binary signal to be read during the nominal half-periods insofar as there is identity between the binary data supported by a binary element and the logic level in the corresponding nominal first half-period.

However, such a reading is erroneous if the pseudo-binary signal is affected by a jitter such that the logic level in a first nominal half-period is different to that corresponding to the binary data. For instance, if in first binary elements of the pseudo-binary signal, the second logic level at "0" is already present from the second quarter of the nominal period on, reading will be false for any active transition of the regenerated clock signal intervening during the second quarter-period.

Furthermore, it should be emphasized that the use of the above-mentioned bistable flip-flop does not enable a correct synchronized signal to be shaped when the phase jumps of the regenerated clock signal are equal to or greater than the nominal half-period. Indeed, if an active transition of the regenerated clock signal occurs during a second nominal half-period of a binary element of the pseudo-binary signal normally corresponding to the second logic level "0", the active transition does not enable a distinction to be made as to whether the binary element is a first or second binary element.

As will be seen hereinafter, phase jumps greater than the nominal half-period may be required for the operating conditions of electrical components, especially to reconcile the operating speed of electrical components with the relatively high pseudo-binary signal rate.

OBJECT OF THE INVENTION

The object of this invention is to obviate the preceding disadvantages.

Another object of this invention is to provide a synchronized pseudo-binary signal having a high rate and comprising binary elements whose width is calibrated by means of a regenerated clock signal having phase jumps greater than those of the prior art.

SUMMARY OF THE INVENTION

Accordingly, a synchronizing device synchronizes a pseudo-do binary signal which has a nominal period and comprises first and second binary elements as above defined, with a clock signal which has phase jumps with a constant amplitude that is at most substantially equal to the clock signal period. The synchronizing device comprises means receiving the pseudo-binary signal for providing a first logic signal having states alternately in the second and first logic levels in response to transitions from the second logic level to the first logic level in the pseudo-binary signal, means controlled by the clock signal for phasing the logic level transitions in the first logic signal with predetermined active transitions of the clock signal thereby deriving a phased logic signal, and means controlled by the clock signal for supplying an outgoing synchronized signal with pulses which are at the first logic level and which have a width calibrated as a function of the period of the clock signal and which are respectively derived in response to the transitions of the phased logic signal.

As will be seen hereinafter, the invention works particularly well when the amplitude of the phase jumps of the clock signal is substantially between a half-period and a period of the clock signal, though the synchronizing device also works for an amplitude of phase jumps lower than a half-period of the clock signal.

According to other features of the invention, the various above-mentioned functional means are in the form of logic components such as flips-flops and gates for the device to be embodied by an integrated circuit.

BRIEF DESCRIPTION OF THE DRAWINGS

Further features and advantages of the invention will be apparent from the following particular description of several preferred embodiments of this invention as illustrated in the corresponding accompanying drawings in which:

FIGS. 5 and 6 show waveforms of signals derived respectively in the two calibrating and synchronizing devices.

DESCRIPTION OF THE PREFERRED EMBODIMENTS

In order to provide a better understanding of the advantages of a calibrating and synchronizing device embodying the invention, a preferred utilisation of the invention is described in terms of the synchronizing of a digital signal that is plesiochronous with a regenerated clock signal, produced in a synchronizing circuit included in a digital time-division multiplexer. Such a synchronizing circuit is already disclosed in U.S. Pat. No. 4,669,080.

The multiplexer receives M plesiochronous digital component signals $s_1$ to $s_M$ having a low nominal bit rate equal to $d_O$ and multiplexes them into a resultant digital signal R having a high bit rate equal to $D>(M.d_O)$. By definition, the component signals $s_1$ to $s_M$ have real rates $d_1$ to $d_M$ varying substantially above and below the low nominal rate $d_O$ within predetermined limits because of independence in respective clocks by means of which the component signals are derived. Before going through multiplexing, the component signals $s_1$ to $s_M$ are converted into synchronous component signals referred to as stuffed signals $sj_1$ to $sj_M$ having a common rate $dj=D/M$ in synchronizing circuits $1_1$ to $1_M$ respectively. The rate $dj$ is substantially higher than the rate $d_O$ and is given by the relationship:

$$dj = (1+\epsilon)d_O$$

where $\epsilon$ denotes a number less than one and is chosen such that the rate $dj$ is always greater than all the real rates of the component signals $s_1$ to $s_M$. The difference between the rate $dj$ and the real rates $d_1$ to $d_M$ of the component signals is filled up by filling bits called stuffing bits in keeping with a known positive-stuffing multiplexing method. In practice, the difference in rates motivating synchronization of the component signals $s_1$ to $s_M$ results in the systematic insertion of stuffing indication bits as well as in a frame alignment word and, where applicable, service bits having predetermined respective locations in a frame of the resultant signal R. For a component signal, stuffing indication bits are intended for indicating whether a stuffing bit filling a predetermined location in the frame is transmitted or replaced by an informative bit, with a view to a subsequent demultiplexing operation on the resultant signal.

Figure 1:
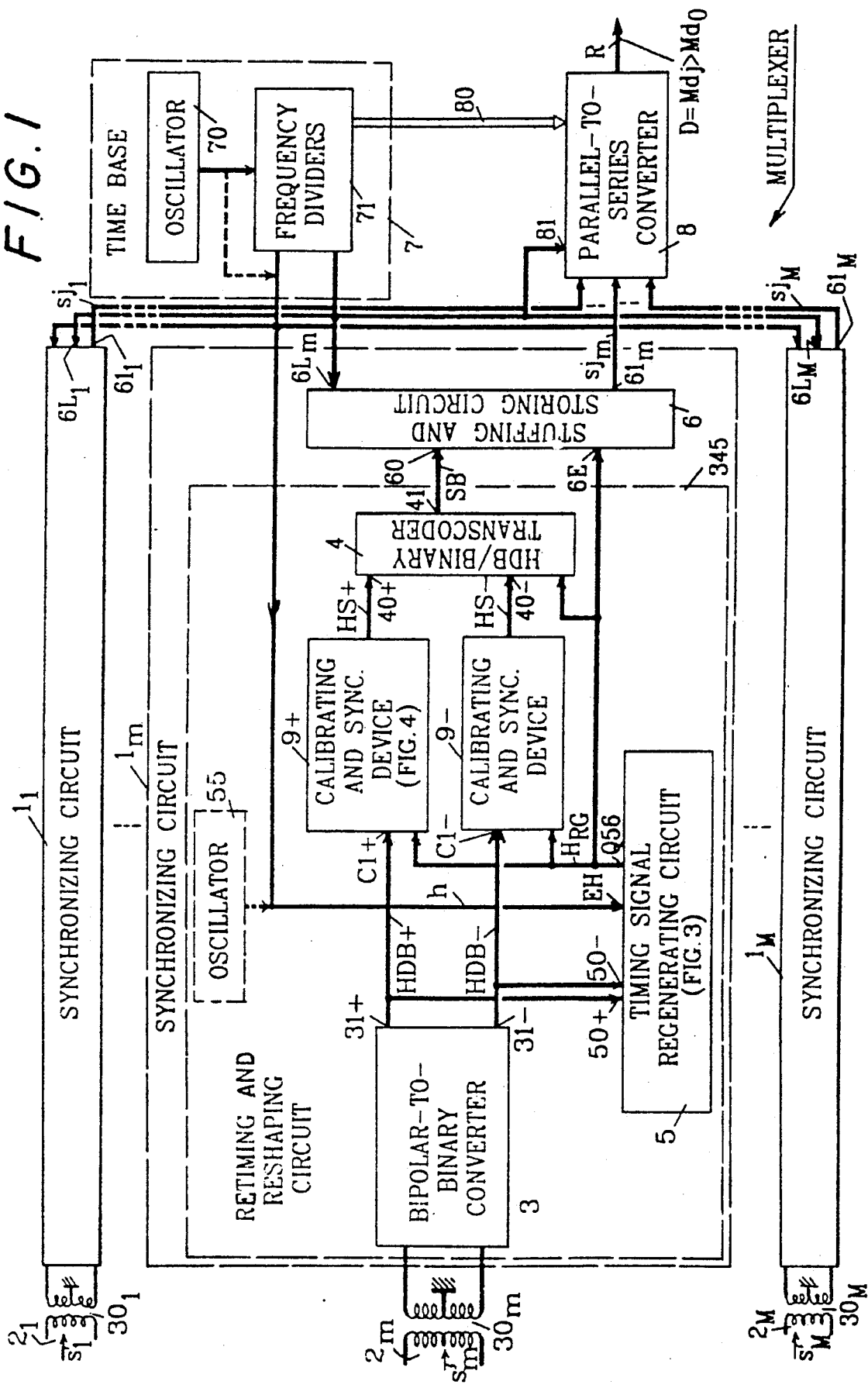
FIG. 1 is a block diagram of a multiplexer multiplexing M plesiochronous digital signals, details being provided of one of the synchronizing circuits in the multiplexer.

Depicted in detail in FIG. 1 is one, $1_m$, of the synchronizing circuits in relation to one, $1_m$, of the component signals, where the integral index m lies between 1 and the integer M. The other synchronizing circuits $1_1$ to $1_M$ related to the other signals $s_1$ to $s_M$ are identical to circuit $1_m$.

The digital component signal $s_m$ is transmitted in a high density bipolar code HDBn in a balanced transmission line $2_m$, or a coaxial line. It is recalled that a digital signal coded in an HDBn code is a bipolar signal in which a binary zero is coded as a "0", and a binary one is coded alternately as a positive polarity mark a or a negative polarity mark b, as shown in a first line in FIG. 2. To be more precise, during a nominal period $T_O=1/d_O \approx T_m=1/d_m$ of a binary element and in the absence of jitter in the signal $s_m$, a bipolar zero is signalled by a null voltage, while marks a and b are signalled by crenels having respectively positive and negative polarities during a first half-period $T_O/2$ and by a null voltage during the second half-period $T_O/2$. n denotes a predetermined integer indicating the maximum number of successive zeros that a bipolar signal can carry. In a sequence of (n+1) successive zeros in the initial binary signal, the last bit is replaced in a known fashion by a bipolarity violation mark. The integer n is usually equal to 3. The component signal $s_m$ is transmitted in HDBn code by the line $2_m$ to a bipolar-to-binary converter 3 via an input differential transformer $30_m$.

The converter 3 distinguishes the bipolar marks a and b as a function of two predetermined voltage threshold couples corresponding to the positive and negative polarities and rectifies the negative marks b. Two outputs 31+ and 31− of the converter 3 respectively feed two pseudo-binary signals HDB+ and HDB− to two inputs 40+ and 40− of a HDBn/binary transcoder 4 and to two inputs 50+ and 50− of an OR gate 50 included in a clock signal regenerating circuit 5 shown in FIG. 3.

Figure 2:
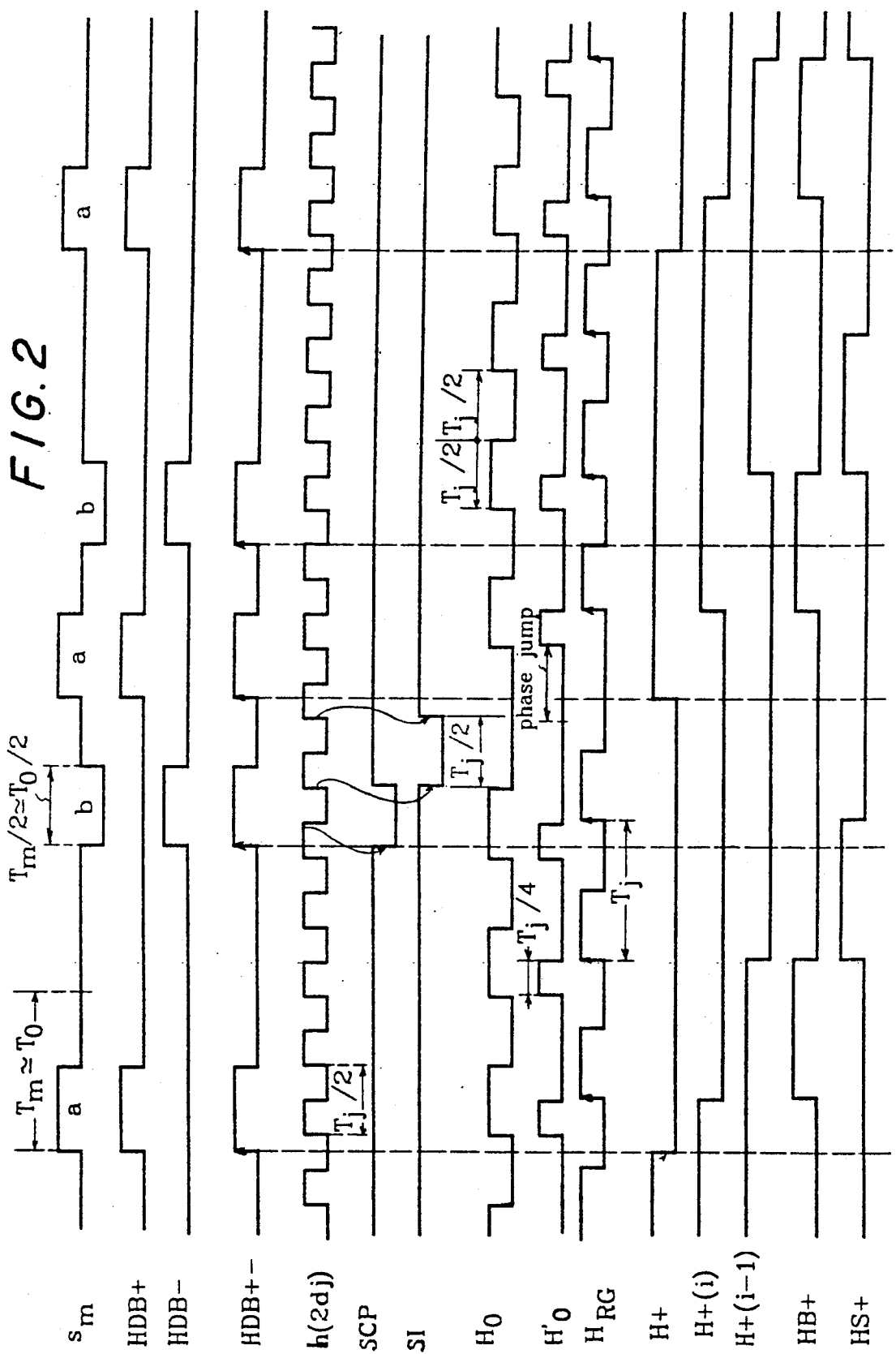
FIG. 2 shows waveforms of signals derived in the synchronizing circuit and used for regenerating a clock signal and synchronizing a pseudo-binary signal in terms of a received plesiochronous signal.

The pseudo-binary signals HDB+ and HDB− are shown in second and third lines in FIG. 2. The signal HDB+ comprises state "1" bits that correspond to the positive marks a in the coded signal $s_m$, and state "0" bits that correspond to both the negative marks b and zeros in the coded signal $s_m$. The signal HDB− comprises state "1" bits that correspond to the negative marks b in the coded signal $s_m$, and state "0" bits that correspond to both the positive marks a and zeros in the coded signal $s_m$. Given that the state "1" bits were alternately coded into positive and negative marks in the bipolar signal $s_m$, any state "1" bit in one or other of the pseudo-binary signals HDB+ and HDB− is always preceded and followed by a zero, i.e., one "1" bit is always flanked by two bits "0". At an output 501 of the OR gate 50, a signal HDB+− results from the combination of the signals HDB+ and HDB− and comprises all the state "1" bits of these two signals, as shown in a fourth line of FIG. 2. In the absence of jitter, a state "1" bit in the signals HDB+ and HDB− is thus comprised of a pulse at the first high logic level during a first nominal period $T_m/2$, and of a second level at zero during a second nominal period $T_m/2$. As will be seen hereinafter, the crenels in the state "1" in the signal HDB+− will serve to regenerate the clock signal that was used to transmit the signal $s_m$.

The HDBn/binary transcoder 4 transcodes the signals HDB+ and HDB− while detecting the bipolarity violations in them and combines these two signals devoid of bipolarity violation into a reshaped signal in binary code SB. An output 41 from the transcoder 4 transmits the reshaped binary signal SB at a mean timing frequency equal to $d_m$ towards an input 60 of a stuffing and storing circuit 6. Transcoding of the pseudo-binary signals HDB+ and HDB− into the binary signal SB in the transcoder 4 and writing of the binary signal SB in a buffer store included in the circuit 6 are controlled by a clock signal $H_{RG}$ regenerated by the circuit 5 and peculiar to the component signal $s_m$.

In this way, the converter 3, transcoder 4, and circuit 5 constitute together a retiming and reshaping circuit 345, sometimes called a junction, that delivers the received signal $s_m$ in the shape of a reshaped binary signal SB, and a clock signal $H_{RG}$ derived from the received signal $s_m$ and more precisely from the signal HDB+−.

The regenerated clock signal $H_{RG}$ is synchronized with a clock signal h produced locally by an oscillator. The frequency of the clock signal h must satisfy the following conditions C1 and C2:

(C1) The frequency of the signal h must be strictly greater than twice the timing frequency of the signal $s_m$:

$$h = A \cdot (1+\mu) \cdot d_m$$

where A designates an integer equal to or greater than 2, and $\mu$ designates a number lower than 1;

(C2) The frequency of the signal h must be compatible with the maximum operating speed of the technology envisaged to integrate the synchronizing circuit $1_m$. In the case at hand, the frequency of the clock signal h must be lower than the maximum operating frequency $f_{max}$ of the CMOS/1.5 µm technology equal to 70 MHz:

$$h < f_{max}.$$

The frequency of the signal h is usually chosen as high as possible so that the regenerated clock signal $H_{RG}$ will not be affected by phase jumps of high amplitude.

If the frequency of the signal h is chosen such that:

$$h = A \cdot dj \text{ with } A \geq 2,$$

this frequency value checks the condition C1 and enables to use a single local oscillator 70 included in a time base 7 of the multiplexer in order to generate the clock frequency h and the frequency timing $D = M \cdot dj$ of the resultant signal R.

However, another local oscillator 55, shown in broken lines in FIG. 1, is useful only if the frequency of the signal h is chosen different from $A \cdot dj$, i.e. $(1+\mu) \cdot d_m \neq dj$.

For instance, according to U.S. Pat. No. 4,669,080, for a multiplexer that stuffs M=4 plesiochronous signals $s_1$ to $s_4$ at the nominal rate $d_O = 2048$ kbit/s, and that multiplexes the stuffed signals into a resultant signal R at a rate $D = M \cdot dj = 8448$ kbit/s, the frequency of the local clock signal h is equal to $A \cdot dj$, where A is e.g. equal to 8, i.e. $h = 16896$ kHz. In this instance, the timing frequency D is obtained by dividing the frequency, by 2 in this case, of the clock signal h directly generated by the local oscillator 70, as shown by means of broken lines in the time base 7 in FIG. 1.

On the other hand, if the frequency timing D of the resultant signal R is greater than the maximum frequency $f_{max}$ of 70 MHz due to the CMOS/1.5 µm technology, the clock signal h is produced by dividing the timing frequency generated by the local oscillator 70. Such is the case for a multiplexer that stuffs four plesiochronous signals $1_1$ to $1_4$ at the nominal rate $d_O = 34.368$ Mbit/s into four signals stuffed at the rate $dj = 34.816$ Mbit/s and that multiplexes these stuffed signals into a resultant signal R at a rate $D = M \cdot dj = 139.264$ Mbit/s. For this second variation, the integer A must be equal to its minimal value 2 in order to check the condition C2, i.e., $h = 2(34.816) = 69.632$ MHz $< 70$ MHz. The frequency of the clock signal h is equal to half the timing frequency D.

In all cases, the local clock signal h is applied at a clock input EH of the circuit 5, and the time base 7 comprises frequency dividers 71 linked to the oscillator 70. In reference to the fifth line of FIG. 2, the frequency of the local clock signal h is supposed equal to twice $A \cdot dj = 2dj$ the rate of the stuffed signals $sj_1$ to $sj_M$, as in the above-mentioned example of the second variation.

By means of the frequency dividers 71, the time base 7 delivers through a bus 80 notably a clock signal of frequency D at a clock input that is common to the shift-register stages in a conventional parallel-to-series converter 8. Furthermore, a clock signal at frequency dj is applied by the frequency dividers 71 to reading clock inputs $6L_1$ to $6L_M$ relative to buffer stores included respectively in the stuffing and storing circuits 6 in the synchronizing circuits $1_1$ to $1_M$, as well as to a clock input 81 of AND gates included in the converter 8. Other inputs of these AND gates respectively receive the stuffed binary signals $sj_1$ to $sj_M$ respectively transmitted by the outputs $61_1$ to $61_M$ of said buffer stores.

The circuit 6 comprises in a known manner, in addition to the buffer store, stuffing requesting means, read means for controlling stuffings, and a phase comparing circuit. The circuit 6 is intended for raising the initial bit rate $d_0$ to the rate dj by systematically inserting stuffing indication bits and, if required, stuffing bits in the reshaped binary signal SB at output 41 from transcoder 4. The bits in the reshaped signal are written in the buffer store in circuit 6 under the control of the regenerated clock signal $H_{RG}$ fed to a writing clock input 6E of the circuit 6. The bits in the stuffed signal $sj_m$ are read under the control of the clock signal applied to the input $6L_m$.

The parallel-to-series converter 8 multiplexes bit-by-bit the M stuffed component signals $sj_1$ to $sj_M$ into the resultant signal R and, at a frame frequency, inserts a frame alignment word and service bits.

Figure 3:
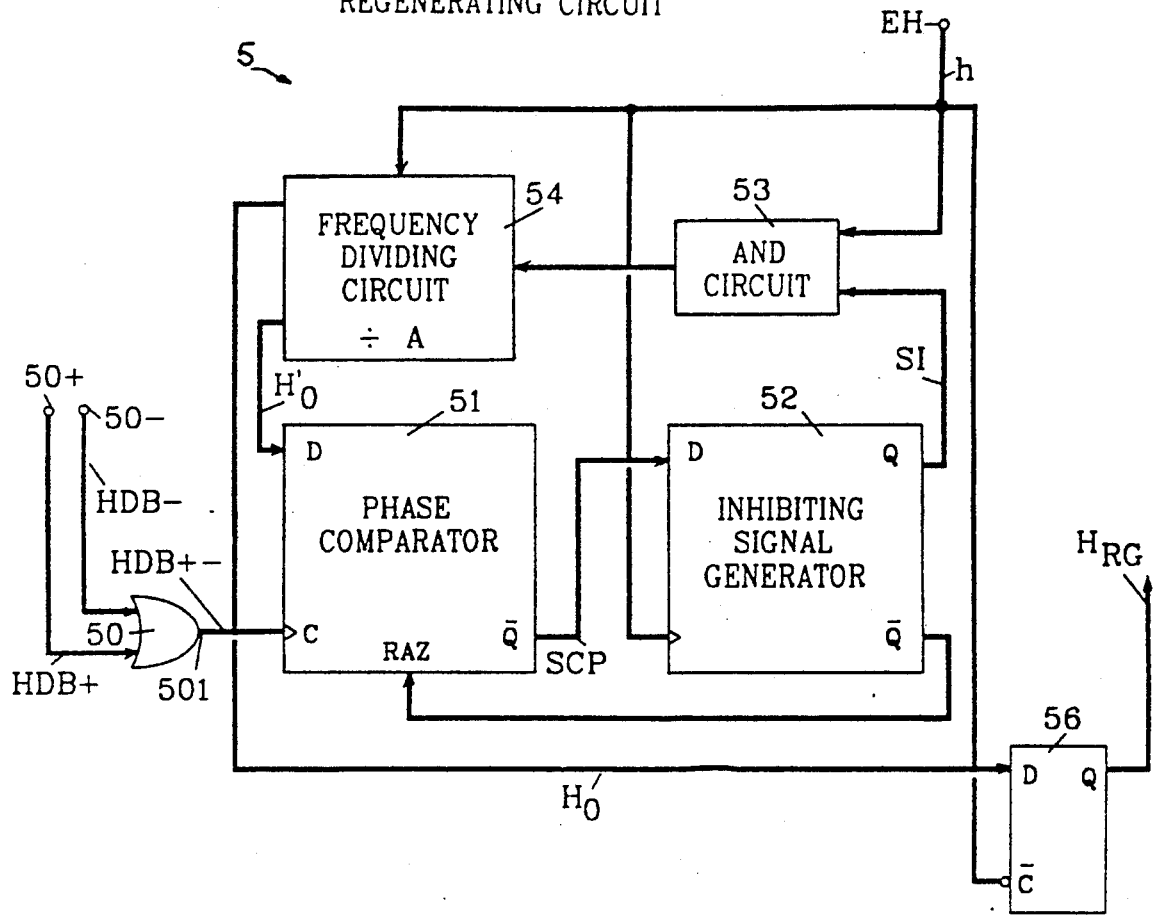
FIG. 3 schematically shows a timing signal regenerating circuit included in the synchronizing circuit.

As shown schematically in FIG. 3, the regenerating circuit 5 comprises in particular, as substantially disclosed in U.S. Pat. No. 4,669,080, in addition to the OR gate 50, a phase comparator 51 in the form of a bistable flip-flop, a local clock pulse inhibition signal generator 52 in the form of a bistable flip-flop, an AND circuit 53, and a frequency dividing circuit 54 of quotient A. It should be recalled that the integer A is equal to 2 relative to FIG. 2. The purpose of the logic circuit 5 is to produce the regenerated clock signal $H_{RG}$ which is comprised of sequences of crenels having the period Tj corresponding to the rate dj of the stuffed signals and in which the crenel sequences are shifted by phase jumps that depend on the phase-shifting between a clock signal at the frequency $d_m$ of the signal $s_m$ almost equal to $d_O$, and a regenerated clock signal $H_O$ at the highest frequency dj equal to that of the stuffed signal $sj_m$.

The phase comparator 51 compares the rectified signal HDB+− combining the pseudo-binary signals HDB+ and HDB− and outgoing from the OR gate 50, with a regenerated clock signal $H_O$ or with any other signal $H'_O$ synchronous with the signal $H_O$ and delivered by the frequency dividing circuit 54 in order to derive a phase correcting signal SCP comprising crenels whose width is proportional to said phase-shifting. The generator 52 synchronizes the crenel edges of the correcting signal SCP with the clock signal h into an inhibiting signal SI. Via the AND circuit 53, each crenel of the inhibiting signal SI deletes a pulse in the local clock signal h in order to obtain at output of the dividing circuit 54 the regenerated clock signal $H_O$ and the signal $H'_O$ to be fed to the phase comparator 51. The various above-mentioned signals are indicated in FIG. 2 for a quotient A equal to 2 and signals $H_O$ and $H'_O$ in phase having crenels of width $T_j/2$ and $T_j/4$ respectively.

As can be seen in the eighth line of FIG. 2, the signal $H_O$ comprises pulses having a width of strictly $T_j/2 = 1/(2dj)$. The pulses are in phase with active transitions, upgoing in this case, of the local clock signal h, and form sequences in which the pulse are strictly spaced by the width $T_j/2$. The pulse sequences are shifted by phase jumps of width $T_j/2$ at a frequency $A(dj - d_m)$ equal to that of the pulse inhibiting signal SI. The phase loop included in the circuit 5 thus limits the mean frequency of the pulse of the regenerated clock signal $H_O$ to the rate $d_m$ of the incoming signal $s_m$. The phase jumps on the clock signal are therefore almost of a half-binary-element, which corresponds to the minimum value of the quotient A.

Compared to the prior art, phase jumps with a mean amplitude of $T_j/2$ in the signal $H_O$ are admissible insofar as the active transitions of the signal $H_O$, such as the rising edges in the crenels of the signal $H_O$, always intervene during first half-periods of the binary elements of the signals HDB+ and HDB− in order to distinguish the states "1" and "0" between binary elements thereby transcoding in the transcoder 4. In this instance are provided at output of the circuit 5, a bistable flip-flop 56 of which the data input D receives the signal $H_O$, the inverse clock input $\overline{C}$ receives the local clock signal h and the output Q produces a regenerated clock signal $H_{RG}$. The signal $H_{RG}$ shown on a tenth line of FIG. 2 has active rising edges substantially centred in the middle of binary element intervals of the signal HDB+−, thanks to the delay of $T_j/4$ created by the flip-flop 56 activated by the falling edges of the signal h. In other words, the rising active edges of the signal $H_{RG}$ oscillate between the limits of the element intervals $T_m$ of the signal HDB+ or HDB−. The phase jumps in the signal $H_{RG}$ are tolerated by the very nature of the stuffing principle in circuit 6 of which the buffer store smoothens out the jitter caused by said phase jumps, thanks to the phase comparator between the signal $H_{RG}$ used in writing and the signal of frequency dj used in reading and applied at the input $6L_m$.

However, in practice, the received bipolar signal $s_m$ has a high frequency jitter which involves a variable sliding of the pulses in the state "1" in the pseudo-binary signals HDB+ and HDB−. This sliding non only affects the time positions of the rising and falling edges of each of the state "1" pulses of a bipolar mark a or b, but also the width of these pulses which can be less than $T_O/2$ or well more than $T_O/2$. The result is that if an active transition of the regenerated signal $H_{RG}$ being used to read a binary element intervenes during one of the nominal half-periods $T_O/2$ of a state "1" binary element where the signal HDB+ or HDB− is equal to "0" when it should be equal to "1", or during one of the half-periods $T_O/2$ of a state "0" binary element where the signal HDB+ or HDB− is equal to "1" when it should be equal to "0", the corresponding binary element in the reshaped binary signal SB is erroneous. This can also induce further errors during transcoding in the transcoder 4, inherent in the detecting of bipolarity violation.

In addition to the jitter in the bipolar signal $s_m$, active rising edges of the regenerated clock signal are included in the second half-periods of the binary elements of the pseudo-binary signal HDB+ or HDB−, as shown in FIGS. 5 and 6, due to the phase jumps of amplitude $T_j/2$. In this case, a direct reading of the binary element would indicate a state "0" whereas the binary element can correspond to a binary "1".

The result is that the known methods for reading and synchronizing binary elements in the signals HDB+ and HDB− based on active transitions of the signal $H_{RG}$, such as rising edges, occurring strictly within the first half-period $T_O/2$ of the binary elements, cannot be implemented when the regenerated clock signal comprises phase jumps of $T_j/2$ to $T_j$ and when the received signal $s_m$ is affected by a high jitter.

Figure 4:
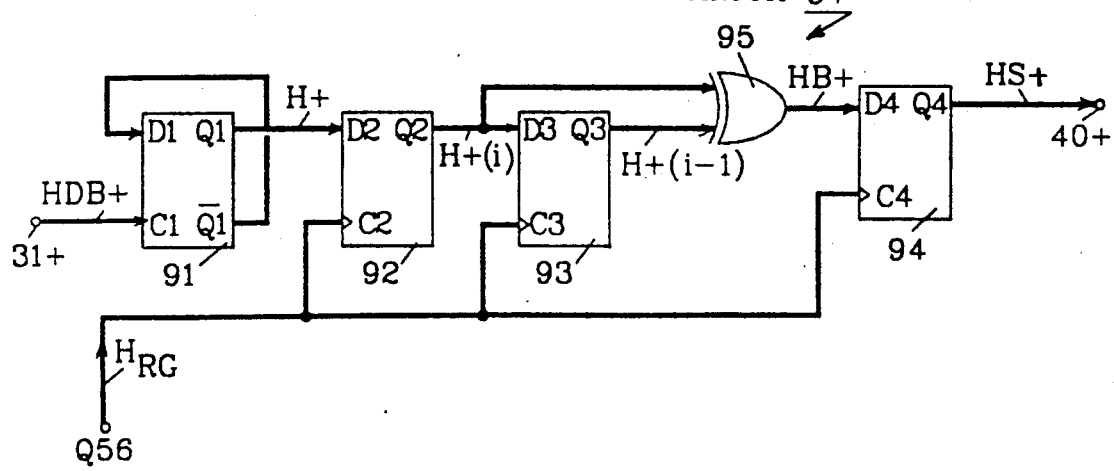
FIG. 4 shows details of one of two pseudo-binary signal calibrating and synchronizing devices embodying the invention included in the synchronizing circuit.

To obviate these disadvantages, two identical calibrating and synchronizing devices 9+ and 9− embodying the invention are respectively interconnected between the outputs 31+ and 31− of the bipolar-to-binary converter 3 and the inputs 40+ and 40− of the HDBn/binary transcoder 4, as shown in FIG. 1. One 9+ of these devices is described hereinafter in reference to FIG. 4.

According to the embodiment illustrated, the device 9+ comprises four D-type bistable flips-flops, 91 to 94, and an Exclusive-OR gate 95. A clock input C1 of the first flip-flop 91 is connected to the output 31+ of the converter 31 and receives the pseudo-binary signal HDB+. Clock inputs C2, C3 and C4 of the three other flips-flops 92, 93 and 94 are connected to the output Q of the flip-flop 56 in the circuit 5 supplying the regenerated clock signal $H_{RG}$. The flips-flops 91 to 94 are supposed to react to rising edges called active transitions "0" to "1" of the signals fed to their clock input.

The flip-flop 91 has an inverse output $\overline{Q1}$ connected to its input D1. The direct output Q1 of the flip-flop 91 is connected to the input D2 of the second flip-flop 92. The first flip-flop 91 is a toggle operating as a divide-by-2 frequency divider. Subsequently, the output Q1 of flip-flop 91 provides a logical signal H+, as shown on a second line of FIG. 5, which alternately changes states in response to the rising transitions in the pseudo-binary signal HDB+. The transitions in the signal H+ are therefore representative of "1" in the signal HDB+. Even if the width of a pulse "1" in the signal HDB+ is relatively large, up to and substantially beyond the period $T_O$, the signal H+ is not erroneous. In fact, due to the very characteristics of the HDBn code, a state "1" pulse in the signal HDB+ identifying a bipolar mark a is always followed by a logic state "0" identifying either a negative mark b or a logic zero. The pseudo-binary signal HDB+ therefore never contains two consecutive elements containing state "1" bits. Consequently, the flip-flop 91 detects the rising edges of the marks a, and the signal H+ changes states in response to each front edge of a "1" pulse in the signal HDB+.

In the signal H+, the binary "1" s are alternately coded by the logic pulses "1" and "0" on a time interval equal to $T_O$, and a binary "0" is coded into the logic level of the binary "1" preceding it.

The signal H+ therefore no longer comprises any intermediary transition during durations equal to at least $2T_O$ as from the rising edges of the marks a. According to the intended purpose of the invention, reading of the level "1" in the signal HDB+ can then take place during any element time interval $T_O$ whatsoever. This reading carried out in the following flip-flop 92 is therefore possible under the control of a signal $H_{RG}$ even affected by intermittent phase jumps substantially of a half-binary-element $T_O/2$ and comprising active transitions "0" and "1" varying in the element intervals $T_O$. A signal H+(i) from the output Q2 of the flip-flop 92 and shown on a fifth line of FIG. 5 comprises alternately "0" to "1" and of "1" to "0" transitions which correspond to those of the signal H+ and which have been phased in flip-flop 92 with the active rising transitions of the regenerated clock signal $H_{RG}$ fed to the clock input of the flip-flop 92. However, the logic levels in the phased logic signal H+ are no longer equivalent to the level "1" read in the signal HDB+. Transcoding is consequently required and is carried out by the flip-flop 93 nd the gate 95.

The output Q2 of the flip-flop 92 is connected to the input D3 of the flip-flop 93 and to a first input of the EXOR gate 95. The output Q3 of the flip-flop 93 is connected to a second input of the gate 95. The output of the gate 95 is connected to the data input D4 of the last flip-flop 94.

The flips-flops 92 and 93 are in series and constitute a two-stage shift-register. The flip-flop 93 copies the state of the flip-flop 92 with a delay equal to the "period" Tj of the signal $H_{RG}$, give or take the phase jumps. Consequently, at a given period Tj, the state of the delayed signal H+(i−1) at the output Q3 of the flip-flop 93 is equal to the state of the signal H+(i) during the period preceding the given period. Since the start of a binary "1", corresponding to a mark a, comes after a transition in the signal H+(i), a transition in the signal H+(i−1) coming after the transition of the signal H+(i) delimits a bit "1" calibrated to the width Tj.

The Exclusive-OR gate 95 compares the phased signal H+(i) and the delayed signal H+(i−1) in order to reproduce a real binary signal HB+ which corresponds to the pseudo-binary signal HDB+ and in which the marks a are indeed "1" crenels having a calibrated width as a function of the period Tj, equal to Tj according to the illustrated embodiment, and derived in response to the front and rear edges and, therefore, the transitions of the phased logic signal H+(i) which are perfectly synchronous with the active rising edges of the regenerated clock signal $H_{RG}$. The gate 95 carries out the following algorithm:

if H+(i)≠H+(i−1), corresponding to HDB+=a, then HB+=1, and if H+(i)=H+(i−1), corresponding to HDB+=0, then HB+=0.

The last flip-flop 94 perfectly recalibrates to the width Tj with abrupt edges, the bits "1" of the signal HB+ that are read at the output from gate 95 and that are likely to have slightly long transition durations due to the crossing of gate 95 and to include disturb pulses when the flips-flops 92 and 93 are changing states. The output Q4 of the flip-flop 94 transmits the calibrated and synchronized signal HS+ to the input 40+ of the transcoder 4.

The second calibrating and synchronizing device 9− carries out identical operations to those described above in respect of the signal HDB−. Signals H−, H−(i), H−(i−1), HB− and HS− produced in the device 9− are shown in FIG. 6, and correspond to the signals H+, H+(i), H+(i−1), HB+ and HS+ respectively.

According to other utilizations, the retiming and reshaping circuit 345 with the devices 9+ and 9− can be included in any device whatsoever receiving a bipolar signal and processing the corresponding pseudo-binary signals, such as a digital switch or a digital terminal, whether the data transmission mode is circuit mode or packet mode, or such as a regenerative repeater.

I claim:

1. A device for synchronizing a pseudo-binary signal with a clock signal into an outgoing synchronized signal, said pseudo binary signal having a nominal period and comprising first and second binary elements, each of said first binary elements being signalled by first and second complementary logic levels respectively substantially during first and second successive nominal half-periods, and each of said second binary elements being signalled by said second logic level substantially during a nominal period, a first binary element always being flanked by two second binary elements, thereby defining logic level transitions from said second logic level to said first logic level located between successive second and first binary elements, said clock signal having a period substantially lower than said nominal period and offering periodical phase jumps for said clock signal to have a mean period equal to said nominal period, thereby defining active clock transitions from one of said logic levels to the other logic level at the beginning of said period of said clock signal, and said clock signal phase jumps having a constant amplitude that is at most substantially equal to said clock signal period, said device comprising:

means receiving said pseudo-binary signal for providing a first logic signal having states alternately in said second and first logic levels in response to said logic level transitions in said pseudo-binary signal, means controlled by the clock signal for phasing said logic level transitions in said first logic signal with active clock transitions in said clock signal, thereby deriving a phased logic signal, and means controlled by said clock signal for supplying said outgoing synchronized signal with pulses which are at said first logic level and which have a width calibrated as a function of the period of said clock signal and which are respectively derived in response to the logic level transitions in said phased logic signal.

2. The device claimed in claim 1, wherein said first logic signal providing means is comprised of a divide-by-2 frequency divider.

3. The device claimed in claim 1, wherein said first logic signal providing means comprises a bistable flip-flop having a clock input receiving said pseudo-binary signal, an inverse output and a data input connected to one another, and a direct output providing said first logic signal.

4. The device claimed in claim 1, wherein said phasing means comprises a bistable flip-flop with a clock input receiving said clock signal, a data input receiving said first logic signal, and an output supplying said phased logic signal.

5. The device claimed in claim 1, wherein said outgoing synchronized signal supplying means comprises means for delaying said phased logic signal by the period of said clock signal into a delayed signal, and means for comparing said phased signal and said delayed signal thereby supplying said pulses in said outgoing synchronized signal when said phased signal and said delayed signal having different logic levels.

6. The device claimed in claim 1, wherein said outgoing synchronized signal supplying means comprises:
   a bistable flip-flop having a clock input receiving said clock signal and a data input receiving said phased logic signal, and
   an Exclusive-OR gate having an input receiving said phased signal and another input connected to a direct output of the flip-flop.

7. The device claimed in claim 6, wherein said outgoing synchronized signal supplying means comprises another bistable flip-flop having a clock input receiving said clock signal and a data input connected to the output of said Exclusive-OR gate.

8. A device as claimed in claim 1, interconnected between one of the two outputs of a bipolar-to-binary converter and one of the two inputs of a HBD/binary transcoder.

9. The device claimed in claim 1, wherein said clock signal is comprised of clock period sequences having phase jumps between them substantially equal to a half-period of said clock signal, each of said active transitions of said clock signal being only included in one nominal period of said pseudo-binary signal.

10. The device as claimed in claim 1, wherein said pseudo-binary signal has a nominal rate of approximately 35 Mbit/s, and wherein said clock signal is derived from a local clock signal having a frequency of approximately 70 MHz.

11. A device for synchronizing a pseudo-binary signal with a clock signal into an outgoing synchronized signal,
   said pseudo-binary signal having a nominal period and comprising first and second binary elements, each of said first binary elements being signalled by first and second complementary logic levels respectively substantially during first and second successive nominal half-periods, and each of said second binary elements being signalled by said second logic level substantially during a nominal period, a first binary elements always being flanked by two second binary elements, thereby defining logic level transitions from said second logic level to said first logic level located between successive second and first binary elements,
   said clock signal having a period substantially lower than said nominal period and offering periodical phase jumps for said clock signal to have a mean period equal to said nominal period, thereby defining active clock transitions from one of said logic levels to the other logic level at the beginning of said period of said clock signal, and
   said clock signal phase jumps having a constant amplitude that is at most substantially equal to said clock signal period,
   said device comprising:
   a first bistable flip-flop having a clock input receiving said pseudo-binary signal, an inverse output and a data input connected to one another, and a direct output providing a first logic signal having states alternately in said second and first logic levels in response to said logic level transitions in said pseudo-binary signal,
   a second bistable flip-flop having a clock input receiving said clock signal, a data input connected to said direct output of said first flip-flop, and an output supplying a phased logic signal resulting from phasing of said logic level transitions in said first logic signal with active clock transitions in said clock signal,
   a third bistable flip-flop having a clock input receiving said clock signal and a data input receiving said phased logic signal, and
   an Exclusive-OR gate having an input receiving said phased signal and another input connected to a direct output of said third flip-flop and an output supplying said outgoing synchronized signal with pulses which are at said first logic level and which have a calibrated width substantially equal to the period of said clock signal and which are respectively derived in response to the logic level transitions in said phased logic signal.

12. A device as claimed in claim 11, comprising a fourth bistable flip-flop having a clock input receiving said clock signal and a data input connected to an output of said Exclusive-OR gate.

* * * * *